US011887586B2

(12) United States Patent
Murali et al.

(10) Patent No.: US 11,887,586 B2
(45) Date of Patent: Jan. 30, 2024

(54) SYSTEMS AND METHODS FOR PROVIDING RESPONSES FROM MEDIA CONTENT

(71) Applicant: Spotify AB, Stockholm (SE)

(72) Inventors: Vidhya Murali, Mountain View, CA (US); Aaron Paul Harmon, Port Washington, NY (US)

(73) Assignee: Spotify AB, Stockholm (SE)

(*) Notice: Subject to any disclaimer, the term of this patent is extended or adjusted under 35 U.S.C. 154(b) by 301 days.

(21) Appl. No.: 17/191,512

(22) Filed: Mar. 3, 2021

(65) Prior Publication Data

US 2022/0284886 A1 Sep. 8, 2022

(51) Int. Cl.
| | |
|---|---|
| G10L 15/26 | (2006.01) |
| G10L 15/18 | (2013.01) |
| G10L 15/10 | (2006.01) |
| G10L 15/05 | (2013.01) |
| G10L 15/08 | (2006.01) |

(52) U.S. Cl.
CPC .......... *G10L 15/1815* (2013.01); *G10L 15/05* (2013.01); *G10L 15/10* (2013.01); *G10L 15/1822* (2013.01); *G10L 2015/088* (2013.01)

(58) Field of Classification Search
None
See application file for complete search history.

(56) References Cited

U.S. PATENT DOCUMENTS

| | | | |
|---|---|---|---|
| 9,852,177 B1 | 12/2017 | Cheung et al. | |
| 2011/0013756 A1* | 1/2011 | Davies | G10L 15/22 379/88.14 |
| 2012/0011109 A1* | 1/2012 | Ambwani | G06F 16/435 707/E17.014 |
| 2012/0131060 A1 | 5/2012 | Heidasch | |
| 2012/0226696 A1* | 9/2012 | Thambiratnam | G06F 16/951 707/750 |
| 2013/0124984 A1* | 5/2013 | Kuspa | H04N 9/475 715/255 |

(Continued)

OTHER PUBLICATIONS

Rajpurkar et al., "SQuAD: 100,000+ Questions for Machine Comprehension of Text", Stanford University, Oct. 11, 2016, 10 pgs.

(Continued)

*Primary Examiner* — Jakieda R Jackson
(74) *Attorney, Agent, or Firm* — Morgan, Lewis & Bockius LLP

(57) ABSTRACT

A method includes retrieving a plurality of transcripts from a database. Each transcript in the plurality of transcripts corresponds to audio from a media content item of a plurality of media content items that are provided by a media providing service. The method also includes applying each transcript of the plurality of transcripts to a trained computational model, and receiving a user request for information regarding a topic. The method further includes, in response to the user request, identifying a transcript from the database that is relevant to the topic, and a position within the transcript that is relevant to the topic. The method also includes providing, by the media providing service, at least a portion of a media content item corresponding to the identified transcript, beginning at a starting position that is based on the position within the identified transcript that is relevant to the topic.

15 Claims, 12 Drawing Sheets

(56) References Cited

U.S. PATENT DOCUMENTS

| | | | | |
|---|---|---|---|---|
| 2014/0169767 A1* | 6/2014 | Goldberg | ............... | G06Q 10/10 386/282 |
| 2014/0258472 A1* | 9/2014 | Shirey | ................... | H04L 65/762 709/219 |
| 2018/0314532 A1* | 11/2018 | Badr | ................... | G06F 3/04817 |
| 2018/0357218 A1* | 12/2018 | Kalluri | ................. | G06F 40/284 |
| 2019/0311709 A1* | 10/2019 | Pappu | .................. | G11B 27/031 |
| 2020/0074985 A1* | 3/2020 | Clark | ...................... | G10L 25/18 |
| 2020/0183971 A1 | 6/2020 | Klein et al. | | |
| 2021/0375289 A1* | 12/2021 | Zhu | ........................ | G10L 15/26 |

OTHER PUBLICATIONS

Girgensohn et al., "A Synergistic Approach to Efficient Interactive Video Retrieval", FX Palo Alto Laboratory, Jun. 2, 2014, 15 pgs.

\* cited by examiner

600

602 At an electronic device having a display, one or more processors, and memory storing instructions for execution by the one or more processors:

610 Retrieve a plurality of transcripts from a database. Each transcript in the plurality of transcripts corresponds to audio from a media content item of a plurality of media content items that are provided by a media providing service.

612 For each transcript of the plurality of transcripts, identify a start of each sentence in the transcript.

620 Apply each transcript of the plurality of transcripts to a trained computational model.

621 The trained computational model is trained, using a training set of questions and answers, to provide a word position within a known text source in response to receiving a user request for information. The training set of questions and answers is distinct and separate from the plurality of transcripts.

622 The string of words and the plurality of transcripts are provided to an input layer of the trained computational model.

623 The string of words and the plurality of transcripts are simultaneously provided to the trained computational model.

624 The plurality of transcripts are provided to the trained computational model prior to receiving the user request.

625 An identifier of the transcript relevant to the topic and an identifier of the position within the transcript relevant to the topic are output by the trained computational model.

630 Receive a user request for information regarding a topic. The user request includes a string of words.

632 The user request is a natural language utterance. Generate the string of words based on the natural language utterance.

640 In response to the user request:

641 Identify a subset of the plurality of transcripts that are relevant to the topic based at least in part on metadata of media content items that correspond to the subset of the plurality of transcripts. The identified transcript is identified from the subset of the plurality of transcripts.

642 Receive, from the trained computational model, a plurality of confidence scores. Each of the plurality of confidence scores is associated with a transcript that is identified to be relevant to the topic.

643 Select the identified transcript based at least in part on the plurality of confidence scores.

640 In response to the user request:

644 Identify, by applying the string of words to the trained computational model, a transcript from the database that is relevant to the topic, and a position within the transcript that is relevant to the topic.

645 Provide, by the media providing service, at least a portion of a media content item corresponding to the identified transcript, beginning at a starting position that is based on the position within the identified transcript that is relevant to the topic.

646 The identified position within the identified transcript that is relevant to the topic corresponds to a position of a word within the identified transcript that is relevant to the topic.

647 The identified position of the word within the identified transcript that is relevant to the topic is located in a middle of a sentence. Initiate playback of the media content item corresponding to the identified transcript at a start of the sentence.

648 The plurality of media content items comprises spoken word media content items.

Figure 6C

SYSTEMS AND METHODS FOR PROVIDING RESPONSES FROM MEDIA CONTENT

TECHNICAL FIELD

The disclosed embodiments relate generally to providing relevant media content items, and, in particular, to providing a media content item for playback beginning at a time that provides a relevant answer to a user request for information.

BACKGROUND

Access to electronic media, such as music and video content, has expanded dramatically over time. As a departure from physical media, media content providers stream media to electronic devices across wireless networks, improving the convenience with which users can digest and experience such content. As more people access media content items using media content providers, there is an opportunity to provide relevant portions of media content items as responses to user requests for information.

SUMMARY

There is a need for systems and methods to provide relevant responses to user requests for information. Conventionally, such systems may perform a search of information available on the internet and provide links or text from the search results that may be relevant to the user's request. However, such responses face the shortcoming of providing information in a generic manner, such as reciting text that is a top search result, or providing links that the user must interact with in order to find the answer to his or her inquiry.

Some embodiments described herein offer a technical improvement by providing responses from audio files (e.g., podcasts) of real people who are knowledgeable in the topic of interest. To do so, the systems and methods described herein use a trained computational model to identify a transcript of a media content item that includes information that is relevant to a user's inquiry, and to identify a position in the transcript that includes the relevant information. The systems and methods then provide playback of the media content item beginning at the position of the relevant information. Thus, users are provided with an audio response that is relevant to their inquiry. In many cases, the audio response is provided by an expert in a field that is related to the topic of their inquiry.

Some embodiments described herein are particularly well-suited to open-ended requests for information, such as "Tell me about the life of a Blue Whale." In this manner, the embodiments described herein promote a "conversational" feel in which users can ask questions and get narrative answers (e.g., from podcasts), almost as if the user were asking the questions of the experts directly. To that end, in some embodiments, the user inquiries comprise requests for perspectives or opinions.

To that end, in accordance with some embodiments, a method is performed at an electronic device that is associated with a media-providing service. The electronic device has one or more processors and memory storing instructions for execution by the one or more processors. The method includes retrieving a plurality of transcripts from a database. Each transcript in the plurality of transcripts corresponds to audio from a media content item of a plurality of media content items that are provided by a media providing service. The method also includes applying each transcript of the plurality of transcripts to a trained computational model, and receiving a user request for information regarding a topic. The user request includes a string of words. The method further includes, in response to the user request, identifying, by applying the string of words to the trained computational model, a transcript from the database that is relevant to the topic, and a position within the transcript that is relevant to the topic. The method also includes providing, by the media providing service, at least a portion of a media content item corresponding to the identified transcript, beginning at a starting position that is based on the position within the identified transcript that is relevant to the topic.

In accordance with some embodiments, a computer system that is associated with a media-providing service includes one or more processors and memory storing one or more programs configured to be executed by the one or more processors. The one or more programs include instructions for retrieving a plurality of transcripts from a database. Each transcript in the plurality of transcripts corresponds to audio from a media content item of a plurality of media content items that are provided by a media providing service. The one or more programs further include instructions for applying each transcript of the plurality of transcripts to a trained computational model, and receiving a user request for information regarding a topic. The user request includes a string of words. The one or more programs also include instructions for, in response to the user request, identifying, by applying the string of words to the trained computational model, a transcript from the database that is relevant to the topic, and a position within the transcript that is relevant to the topic. The one or more programs further include instructions for providing, by the media providing service, at least a portion of a media content item corresponding to the identified transcript, beginning at a starting position that is based on the position within the identified transcript that is relevant to the topic.

In accordance with some embodiments, a computer-readable storage medium has stored therein instructions that, when executed by a server system that is associated with a media-providing service, cause the server system to retrieve a plurality of transcripts from a database. Each transcript in the plurality of transcripts corresponds to audio from a media content item of a plurality of media content items that are provided by a media providing service. The instructions also cause the server system to apply each transcript of the plurality of transcripts to a trained computational model, and receive a user request for information regarding a topic. The user request includes a string of words. The instructions further cause the server system to, in response to the user request, identify, by applying the string of words to the trained computational model, a transcript from the database that is relevant to the topic, and a position within the transcript that is relevant to the topic. The instructions also cause the server system to provide, by the media providing service, at least a portion of a media content item corresponding to the identified transcript, beginning at a starting position that is based on the position within the identified transcript that is relevant to the topic.

Thus, systems are provided with improved methods for providing relevant media content items as responses to user requests for information.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 6A-6C are flow diagrams illustrating a method of providing playback of media content items in response to user requests for information, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first set of parameters could be termed a second set of parameters, and, similarly, a second set of parameters could be termed a first set of parameters, without departing from the scope of the various described embodiments. The first set of parameters and the second set of parameters are both sets of parameters, but they are not the same set of parameters.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1A:
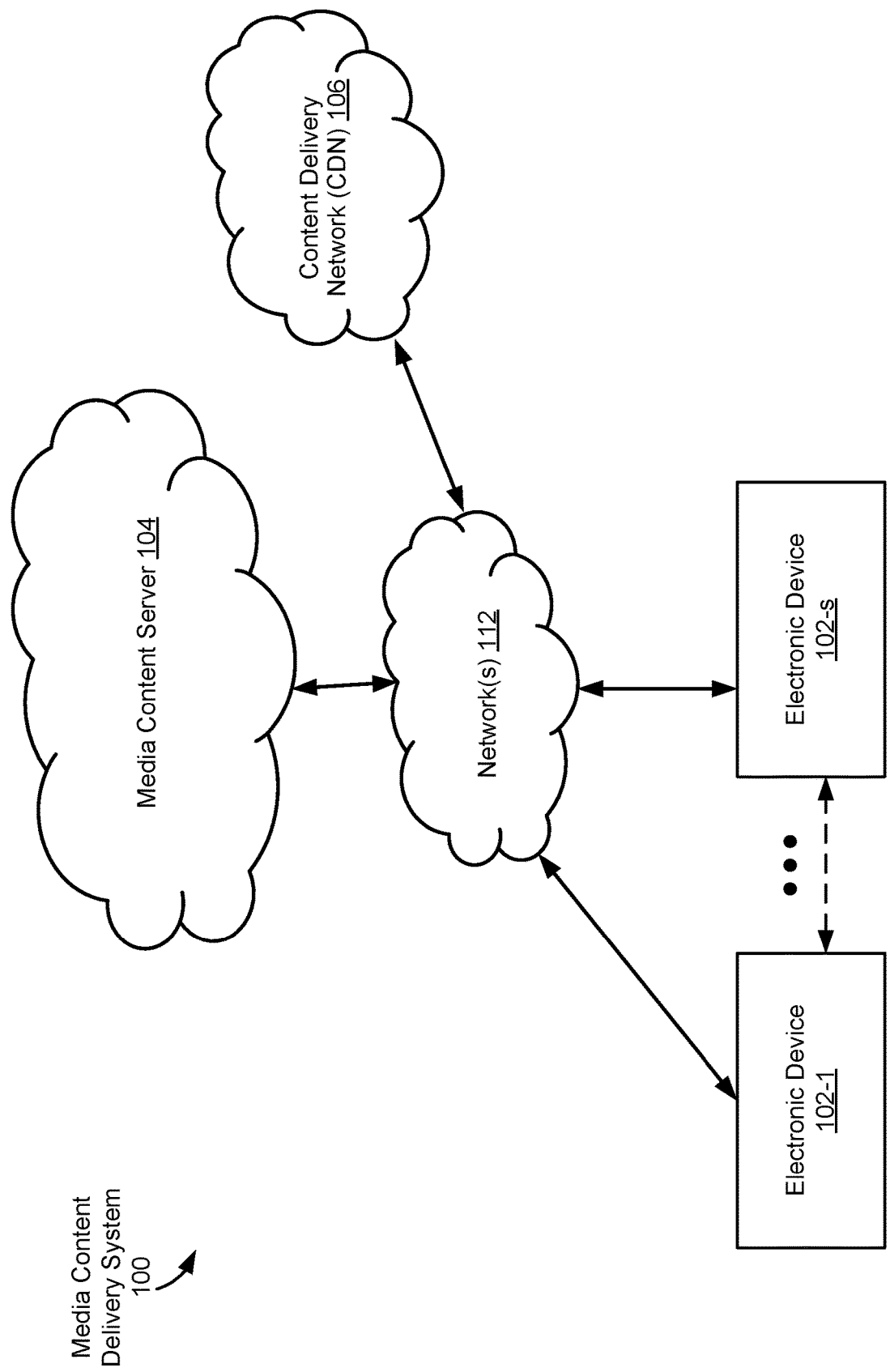
FIG. 1A is a block diagram illustrating a media content delivery system, in accordance with some embodiments.

FIG. 1A is a block diagram illustrating a media content delivery system, in accordance with some embodiments. The media content delivery system 100 includes one or more electronic devices 102 (e.g., electronic device 102-1 to electronic device 102-s, where s is an integer greater than one), one or more media content servers 104, and/or one or more content delivery networks (CDNs) 106. The one or more media content servers 104 are associated with (e.g., at least partially compose) a media-providing service. The one or more CDNs 106 store and/or provide one or more content items (e.g., to electronic devices 102). In some embodiments, the one or more CDNs 106 are associated with the media-providing service. In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-s are the same type of device (e.g., electronic device 102-1 and electronic device 102-s are both speakers). Alternatively, electronic device 102-1 and electronic device 102-s include two or more different types of devices.

In some embodiments, electronic devices 102-1 and 102-s send and receive media-control information through network(s) 112. For example, electronic devices 102-1 and 102-s send media control requests (e.g., requests to play music, movies, videos, or other media items, or playlists thereof) to media content server 104 through network(s) 112. Additionally, electronic devices 102-1 and 102-s, in some embodiments, also send indications of media content items to media content server 104 through network(s) 112.

In some embodiments, the media content items are uploaded to electronic devices 102-1 and 102-s before the electronic devices forward the media content items to media content server 104.

In some embodiments, electronic device 102-1 communicates directly with electronic device 102-s (e.g., as illustrated by the dotted-line arrow), or any other electronic device 102. As illustrated in FIG. 1A, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-s. In some embodiments, electronic device 102-1 communicates with electronic device 102-s through network(s) 112. In some embodiments, electronic device 102-1 uses the direct connection with electronic device 102-s to stream content (e.g., data for media items) for playback on the electronic device 102-s.

In some embodiments, electronic device 102-1 and/or electronic device 102-s include a media application 222 (FIG. 2) that allows a respective user of the respective electronic device to upload (e.g., to media content server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). In some embodiments, the electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, and/or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 provides media content items to electronic devices 102-s (e.g., users) of the media-providing service. In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 1B:
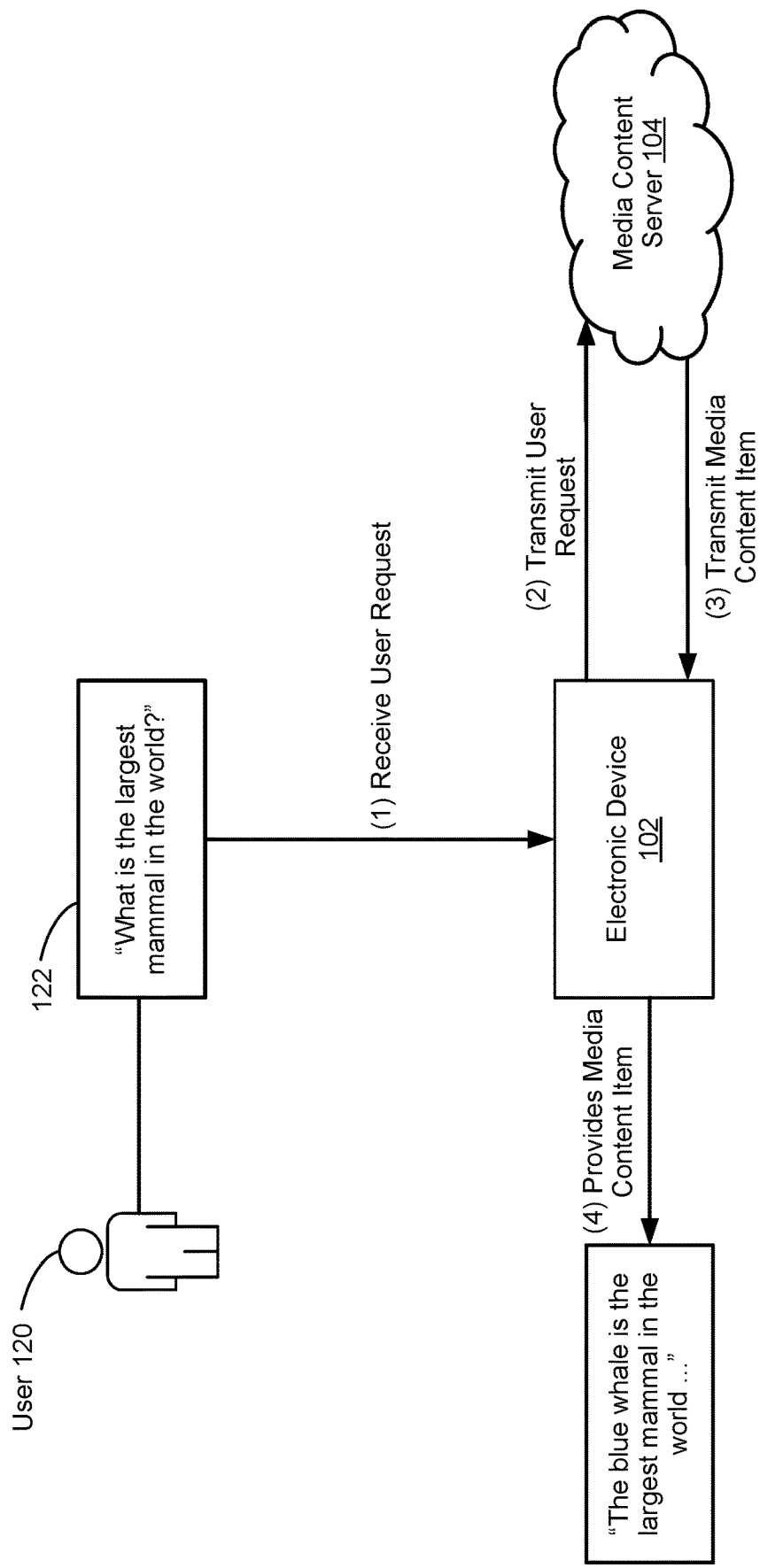
FIG. 1B illustrates providing a media content item in response to a user request for information, in accordance with some embodiments.

FIG. 1B illustrates providing a media content item as a response to a user request for information, in accordance with some embodiments. An electronic device 102 that is in communication with media content server 104 receives (step 1) a user request 122 for information, "what is the largest mammal in the world?" The electronic device 102 is any electronic device that can receive user inputs. For example, electronic device 102 may be a desktop computer, a laptop computer, a tablet, a smartphone, a smart speaker, or a smart wearable accessory (such as a smart watch). The user request 122 for information may be a text based request, such as a request that is typed into an input interface of the electronic device 102, or an audio based request, such as a natural language utterance. The electronic device 102 may be in communication with the media content server 104 in a variety of ways. For example, the electronic device 102 may include software (e.g., a program, an application) that allows the electronic device 102 to transmit and receive data from the media content server 104. For example, if media content server 104 is a server that provides podcasts, the electronic device 102 may include an application that can access and provide playback of podcasts provided by the media content server 104.

The electronic device 102 transmits (step 2) the user request 122 to the media content server 104. The media content server 104 selects a media content item to be provided as a response to the user request 122 and transmits (e.g., provides) (step 3) the selected media content item to the electronic device 102. The electronic device 102 then provides (step 4) at least a portion of the media content item to the user, "The blue whale is the largest mammal in the world." For example, the media content server 104 determines that a podcast episode includes information that is relevant to the user request. The relevant information may be located in the middle of a podcast episode (e.g., the word "blue whale" is played at time 15 minutes and 22 seconds of the podcast episode). (Note that, as used herein, the word "middle" is intended to denote a position that is neither at the beginning nor end of a media content item, sentences, etc., and is not intended to imply a position that is exactly halfway between the beginning and end of the media content item, sentence, etc.). In such cases, the media content server 104 provides the electronic device 102 with the media content item for playback as well as instructions to initiate playback of the media content item at a time that is different from a default start time (e.g., at time 0 minutes and 0 seconds) of the media content item. For example, the media content server 104 may provide instructions to initiate playback of the media content item at 15 minutes and 22 seconds of the podcast episode so that the electronic device 102 provides the response "blue whale . . . " Alternatively, the media content server 104 may provide instructions to initiate playback of the media content item at 15 minutes and 21 seconds of the podcast episode so that the electronic device 102 provides the response "The blue whale is the largest . . . " (e.g., a full sentence response). Note that, in addition to the example provided above (a request for a fact), the embodiments described herein are particularly well-suited to open-ended requests for information, such as "Tell me about the life of a Blue Whale."

Figure 2:
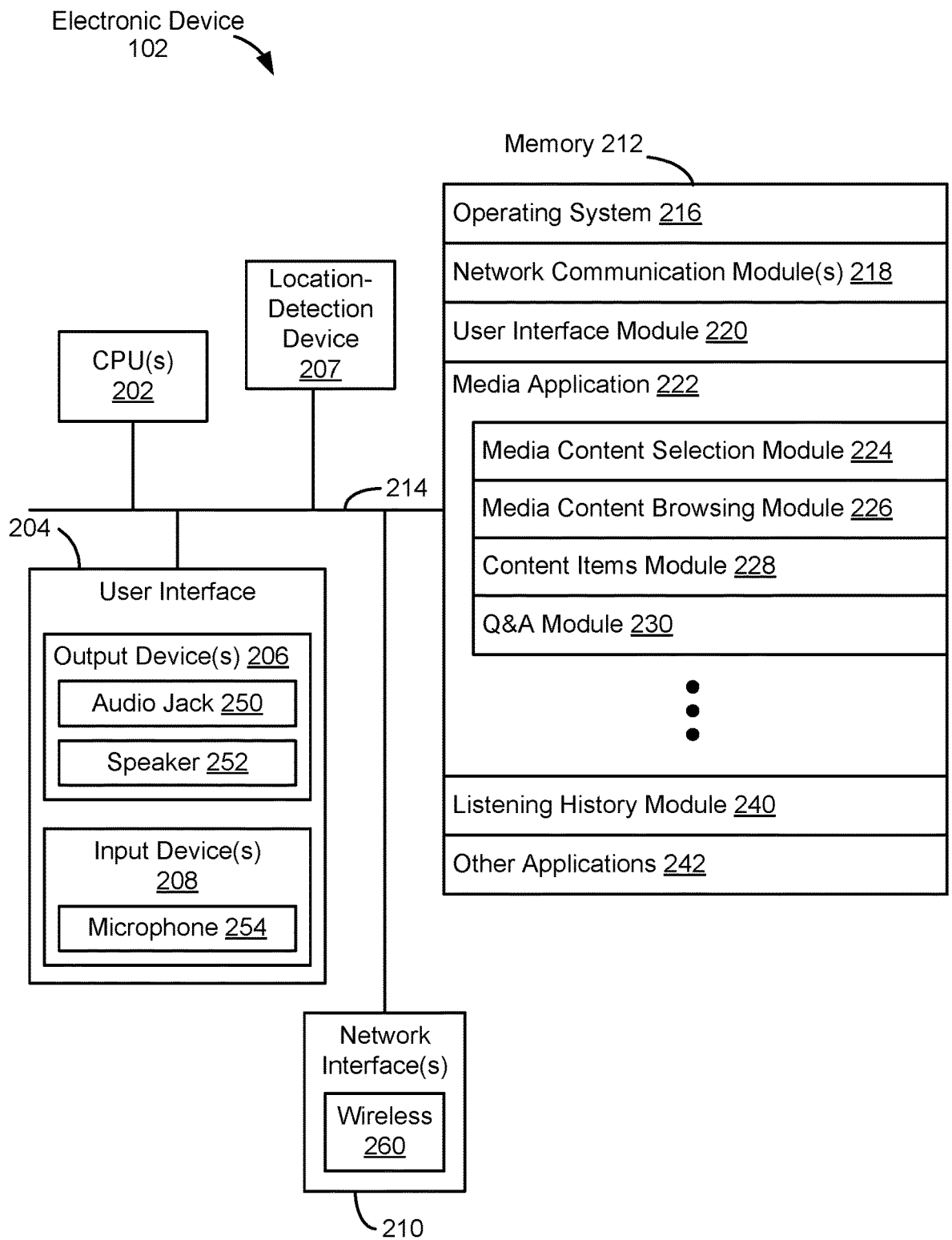
FIG. 2 is a block diagram illustrating a client device, in accordance with some embodiments.

FIG. 2 is a block diagram illustrating an electronic device 102 (e.g., electronic device 102-1 and/or electronic device 102-s, FIG. 1A), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include an audio jack 250 (or other physical output connection port) for connecting to speakers, earphones, headphones, or other external listening devices and/or speaker 252 (e.g., speakerphone device). Furthermore, some electronic devices 102 use a microphone and voice recognition device to supplement or replace the keyboard. Optionally, the electronic device 102 includes an audio input device (e.g., a microphone 254) to capture audio (e.g., speech from a user).

Optionally, the electronic device 102 includes a location-detection device 207, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, and/or or other wireless (e.g., Bluetooth-compatible) devices (e.g., for streaming audio data to the electronic device 102 of an automobile). Furthermore, in some embodiments, the wireless interface 260 (or a different communications interface of the one or more network interfaces 210) enables data communications with other WLAN-compatible devices (e.g., electronic device(s) 102) and/or the media content server 104 (via the one or more network(s) 112, FIG. 1A).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the electronic device 102 to other computing devices (e.g., other electronic device(s) 102, and/or media content server 104) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
    - a media content selection module 224 for selecting one or more media content items and/or sending, to the media content server, an indication of the selected media content item(s);
    - a media content browsing module 226 for providing controls and/or user interfaces enabling a user to navigate, select for playback, and otherwise control or interact with media content, whether the media content is stored or played locally or remotely;
    - a content items module 228 for storing media items for playback at the electronic device; and
    - a question and answer module 230 (also referred to herein as Q&A module 230) for receiving user requests for information, processing the user requests, and providing media content items in response to the user requests for information. In some embodiments, rather than a question and answer module 230, the media application 222 simply includes a voice command module that receives voice commands and passes them to a server for natural language processing;

a listening history module 240 (sometimes referred to as a playback history module) for storing (e.g., as a list for each user) media content items that have been presented (e.g., streamed, provided, downloaded, played) to a respective user and/or analyzing playback patterns for one or more users; and other applications 242, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
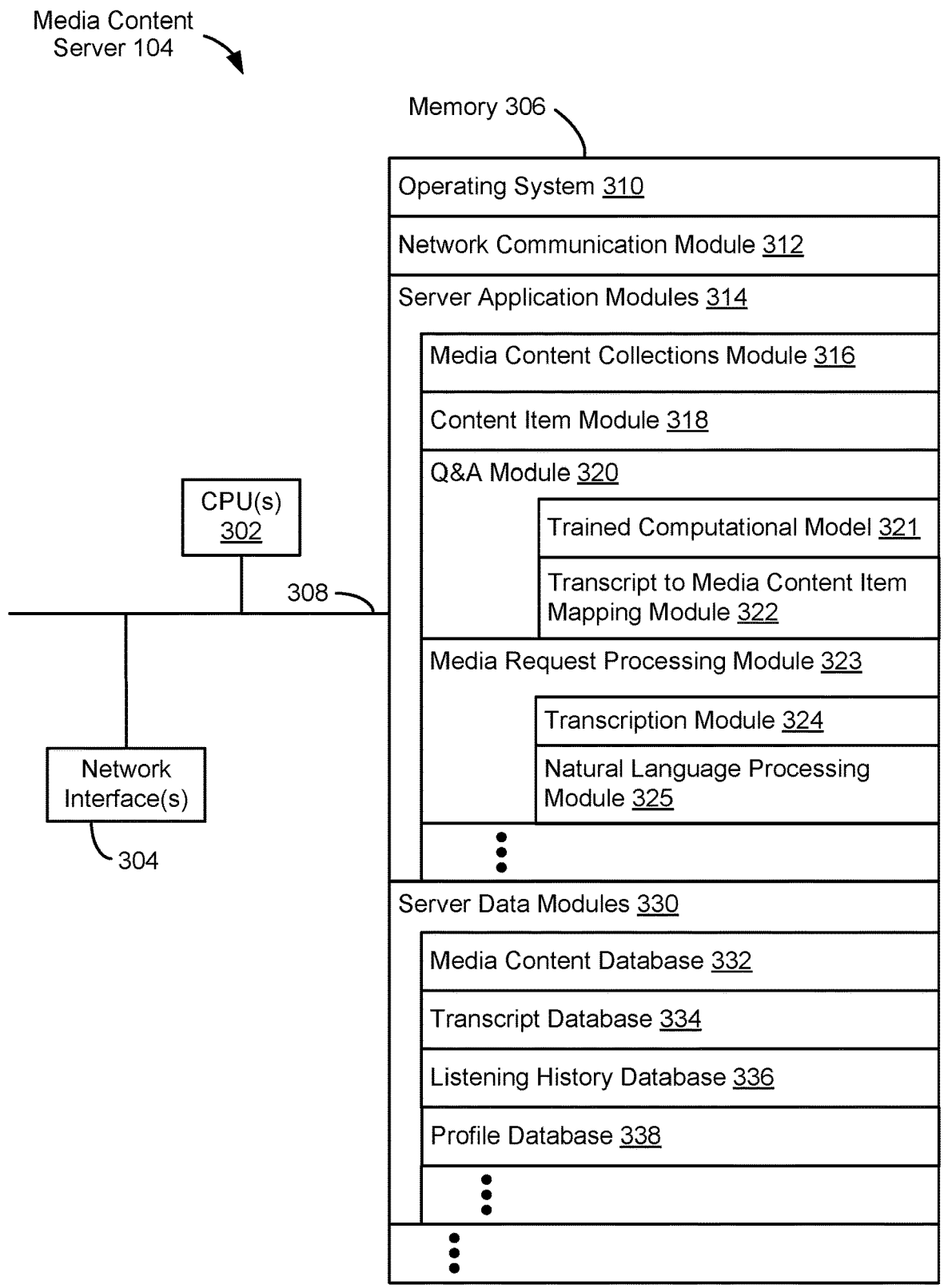
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory device, and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content server 104 to other computing devices via one or more network interfaces 304 (wired or wireless) connected to one or more networks 112;

one or more server application modules 314 for performing various functions with respect to providing and managing a content service, the server application modules 314 including, but not limited to, one or more of:

a media content collections module 316 for storing and/or creating (e.g., curating) media content collections, each media content collection associated with one or more descriptor terms (e.g., playlist titles and/or descriptions) and/or including one or more media content items;

a content item collection module 318 for collecting and storing media items for playback;

a question and answer module 320 (also referred to herein as Q&A module 320) for receiving user requests for information, processing the user requests, and providing media content items in response to the user requests for information. The Q&A module includes one or more trained computational models 321 (e.g., neural networks) that are trained to identify transcripts and word positions in the transcript in response to the user request for information, and, optionally, a transcript to media content item mapping module 332 for mapping transcripts to a corresponding media content item and for mapping a word position in the transcript to a corresponding time in the corresponding media content item, including mapping a sentence start time when the word position in the transcript and the corresponding time in the corresponding media content item are not at a start of a sentence (e.g., in the middle of a sentence or at an end of a sentence); and a media request processing module 323 for processing user requests for information. The media request processing module 323 includes a transcription module 324 for transcribing user requests from audio to text, and a natural language processing module 325 for converting the user request into a string of text (e.g., in which stop words have been removed from the user request) to be input into the one or more trained computation models 321; and one or more server data module(s) 330 for handling the storage of and/or access to media items and/or metadata relating to the media items; in some embodiments, the one or more server data module(s) 330 include:

a media content database 332 for storing media content items;

a transcript database 334 for storing transcripts corresponding to media content items;

a listening history database 336 (also referred to as a playback history database) for storing (e.g., as a list for each user) media content items that have been consumed (e.g., streamed, listened, viewed) by a respective user as well as storing listener retention information for media content items played by a respective user; and a profile database 338 for storing user profiles (e.g., user information) of users of the media-providing service.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, memory 212 stores one or more of the above identified modules described with regard to memory 306. In some embodiments, memory 306 stores one or more of the above identified modules described with regard to memory 212.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4A:
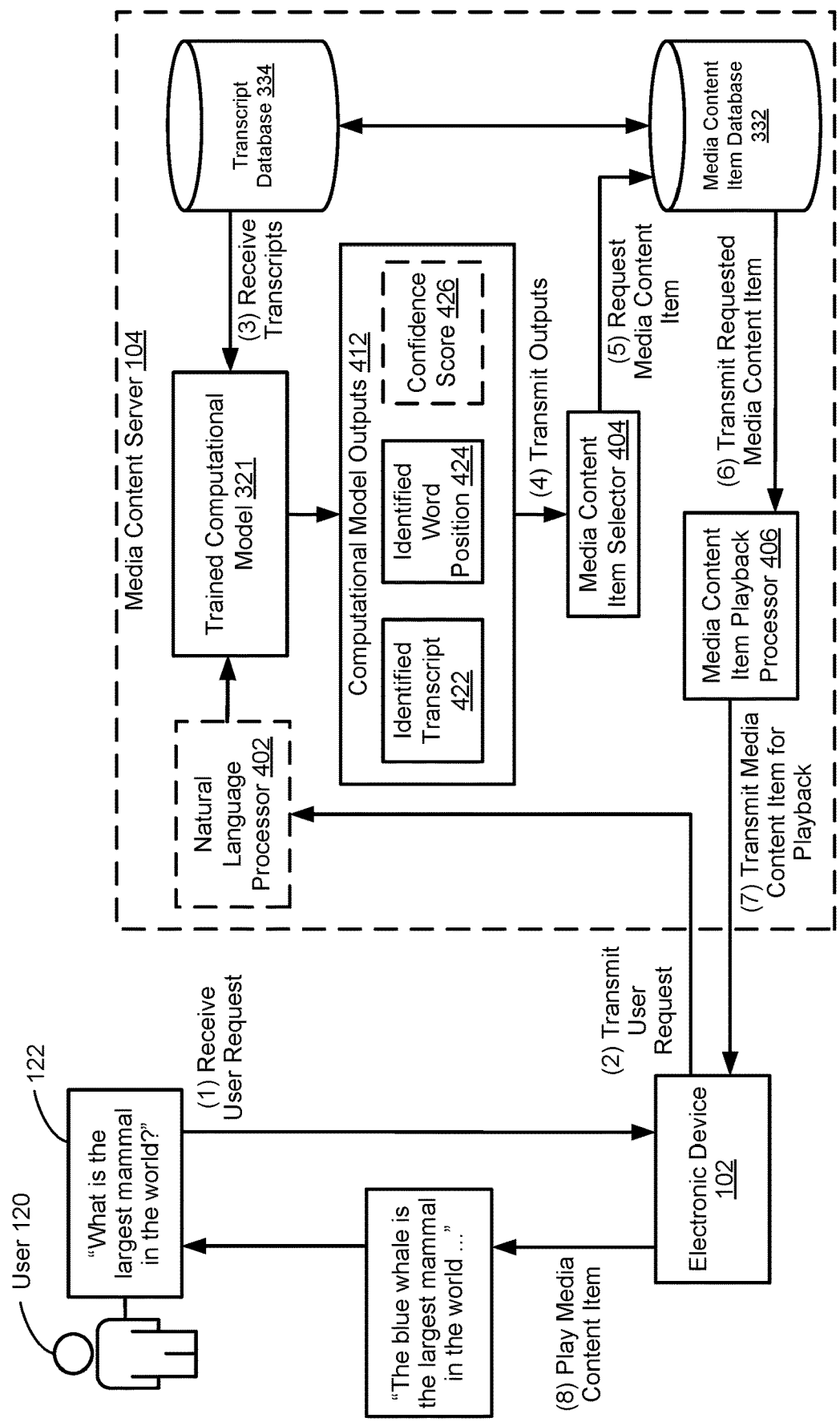
FIG. 4A illustrates how media content items are selected for provision in response to user requests for information, in accordance with some embodiments.

FIG. 4A illustrates how media content items are selected for provision in response to user requests for information, in accordance with some embodiments. An electronic device 102 that is in communication with a media content server 104 (e.g., via a communications network) receives (step 1) a user request 122 from a user 120. In the example, the user request 122 asks, "What is the largest mammal in the world?" The user request 122 can be received by the electronic device as text, such as a user 120 typing the question into a text box or user interface of electronic device 102, or can be received as a natural language utterance, such as a user speaking the request 122 aloud (e.g., a user utterance) and a microphone associated with the electronic device 102 detecting the user utterance. The electronic device 102 transmits (step 2) the user request 122 to the media content server 104.

In some embodiments, the media content server 104 includes a natural language processor 402 that receives the user request 122 that is transmitted from the electronic device 102. The natural language processor 402 includes one or more programs or instructions, such as natural language processing module 325 shown in FIG. 3, to process the user request 122. In such cases, the natural language processor 402 provides a processed user request as an input to the trained computational model(s) 321. In some embodiments, the user request 122 is transmitted from the electronic device 102 directly to the trained computational model(s) 321.

The trained computational model(s) 321 also receives (step 3) transcripts from a transcript database 334 that stores a plurality of transcripts. Each transcript of the plurality of transcripts is associated with a media content item of a plurality of media content items stored in a media content item database 332. In some embodiments, the trained computational model(s) 321 receives transcripts from the transcript database 334 prior to receiving the processed user request from the natural language processor 402. In response to receiving the processed user request from the natural language processor 402, the trained computational model(s) 321 identifies a transcript 422 of the plurality of transcripts, and a word position 424 of a word in the transcript 422. The word in the transcript 422 is determined by the computational model(s) 321 to be relevant to the user request 122. The trained computational model(s) 321 provides outputs 412, including the identified transcript 422 (e.g., an identifier of the media content item) and the identified word position 424 (e.g., a time within the media content item). In some embodiments, the computational model outputs 412 also include a confidence score 426 that provides an indication of a confidence that the identified transcript 422 and the identified word position 424 are relevant to the user request 122. In some embodiments, the computational model outputs 412 also include the word that is determined to be relevant to the user request 122.

The trained computational model(s) 321 transmits (step 4) the computational model outputs 412 to a media content selector 404. The media content selector 404 includes one or more programs or instructions, such as transcript to media content item mapping module 322, for identifying a media content item that corresponds to the identified transcript 422, identifying a time within the corresponding media content item that corresponds to the identified word position 424 in the transcript 422, and in some cases, for identifying a time corresponding to a start of a sentence that the identified word associated with the identified word position 424 is in. The media content selector 404 identifies the media content item that corresponds to the identified transcript 422 (e.g., the transcript is a transcription of audio played in the corresponding media content item), and requests (step 5) the media content item from the media content item database 332. The media content item database transmits (step 6) the requested media content item to a media content item playback processor 406. The media content item playback processor 406 transmits (step 7) the media content item to the electronic device 102 for playback by the electronic device 102.

In addition to providing the media content item, the media content item playback processor 406 also provides a time (e.g., playback initiation time) within the media content item to begin playback of the media content item. In response to receiving the media content item and the playback initiation time, the electronic device 102 provides the media content item starting at the playback initiation time. In some embodiments, the playback initiation time is different from a default start time (e.g., different from default start time of 0 minutes and 0 seconds) of the media content item. In some embodiments, the playback initiation time is the same as the default start time of the media content item (e.g., the playback initiation time is 0 minutes and 0 seconds). In this example, the trained computational model(s) 321 identified a transcript and a word or phrase in the transcript, "whale" or "blue whale" that is predicted, by the trained computational model(s) 321, to be relevant to the user request 122 or the processed user request 122 input to the trained computational model(s) 321. The word "whale" may be, for example, the 274th word in the transcript. The media content item that corresponds to the identified transcript is transmitted to the electronic device for playback, and the 274th word in the transcript is determined to correspond to a time of 5 minutes and 3 seconds in the media content item. However, it may be unsatisfactory to simply provide the words "whale" or "blue whale" to the user as a response to the user request 122. Thus, the media content item playback processor 406 may identify a time within the media content item that corresponds to the start of the sentence that contains the identified word "whale" or the words "blue whale." In this, example, the media content item starts playing the start of the sentence at a time of 5 minutes and 2 seconds. Thus, the media content item playback processor transmits the media content item and the playback initiation time of 5 minutes and 2 seconds to the electronic device 102 and the electronic device 102 begins play back of the media content item starting at time of 5 minutes and 2 seconds, "The blue whale is the largest mammal in the world."

The electronic device 102 may continue playback of the media content item until the end of the media content item or until the user provides a command (e.g., verbal command or gesture command via a user interface of the electronic device) to cease or pause playback of the media content item.

Note that the embodiments described herein are particularly well-suited to open-ended requests for information, such as "Tell me about the life of a Blue Whale." In this manner, the embodiments described herein promote a "conversational" feel in which users can ask questions and get narrative answers (e.g., from podcasts), almost as if the user were asking the questions of the experts directly.

Figure 4B:
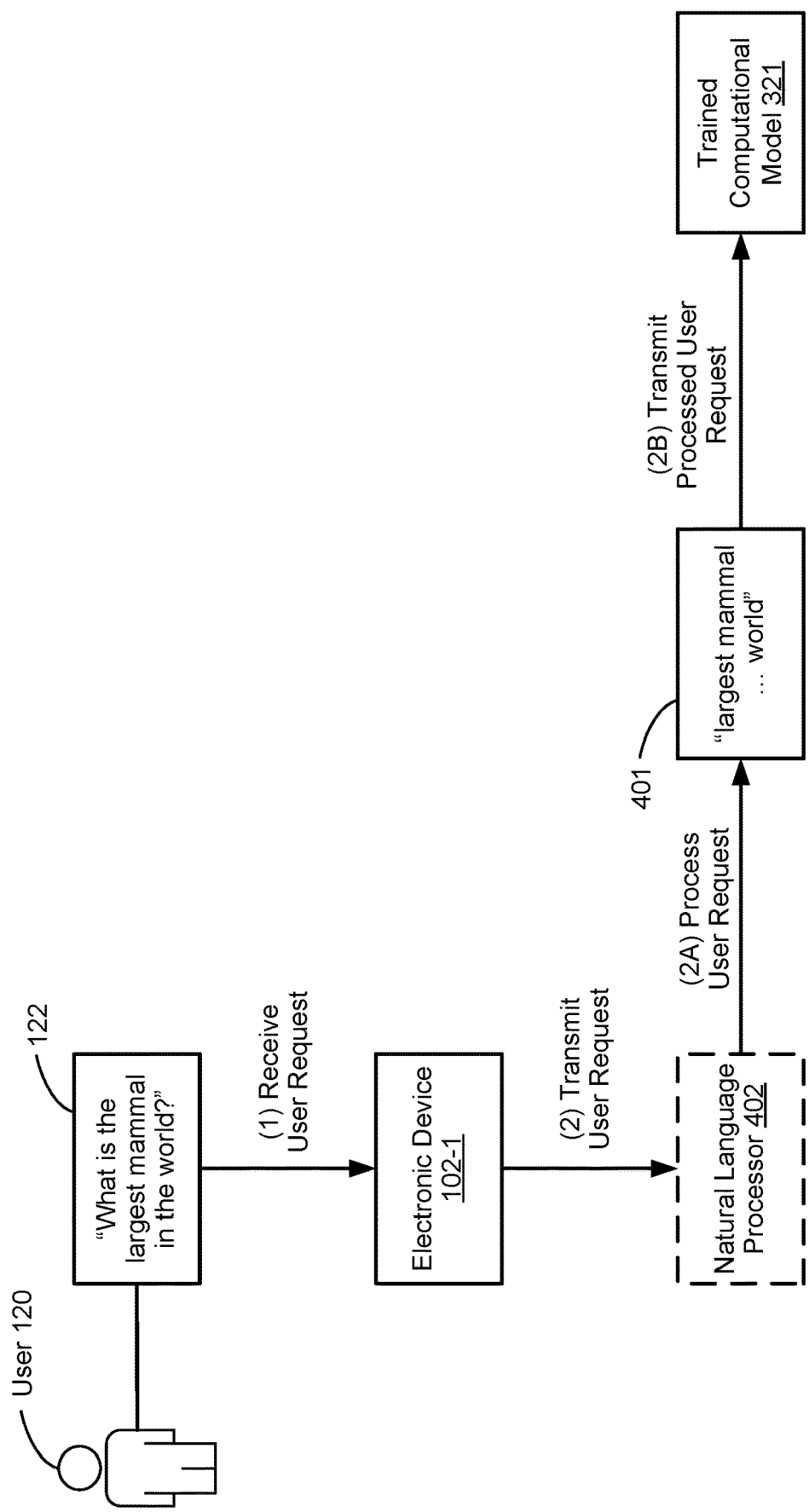
FIG. 4B illustrates processing user requests for information, in accordance with some embodiments.

FIG. 4B illustrates processing user requests 122 for information, in accordance with some embodiments. The user request 122 includes a string of words, in this example, "what is the largest mammal in the world." In some embodiments, the user request 122 (e.g., the string of words in the user request 122) is used as an input to the trained computational model(s) 321 without any processing. In some embodiments, the user request 122 is transmitted to a natural language processor 402 to be processed prior to transmitting the user request to the trained computational model(s) 321. In such cases, the natural language processor 402 processes (step 2A) the user request 122, such as by identifying important words or phrases within the user request 122, or by masking or removing (e.g., filtering out) unnecessary words or filler words, such as "the" and "a." Processing of the user request 122 can be performed on either text inputs or utterances. When the user request 122 is an utterance, the natural language processor 402 may also transcribe the user request 122 into text prior to processing the user request. The processed user request 401 is transmitted (step 2B) to the trained computational model(s) 321.

Figure 4C:
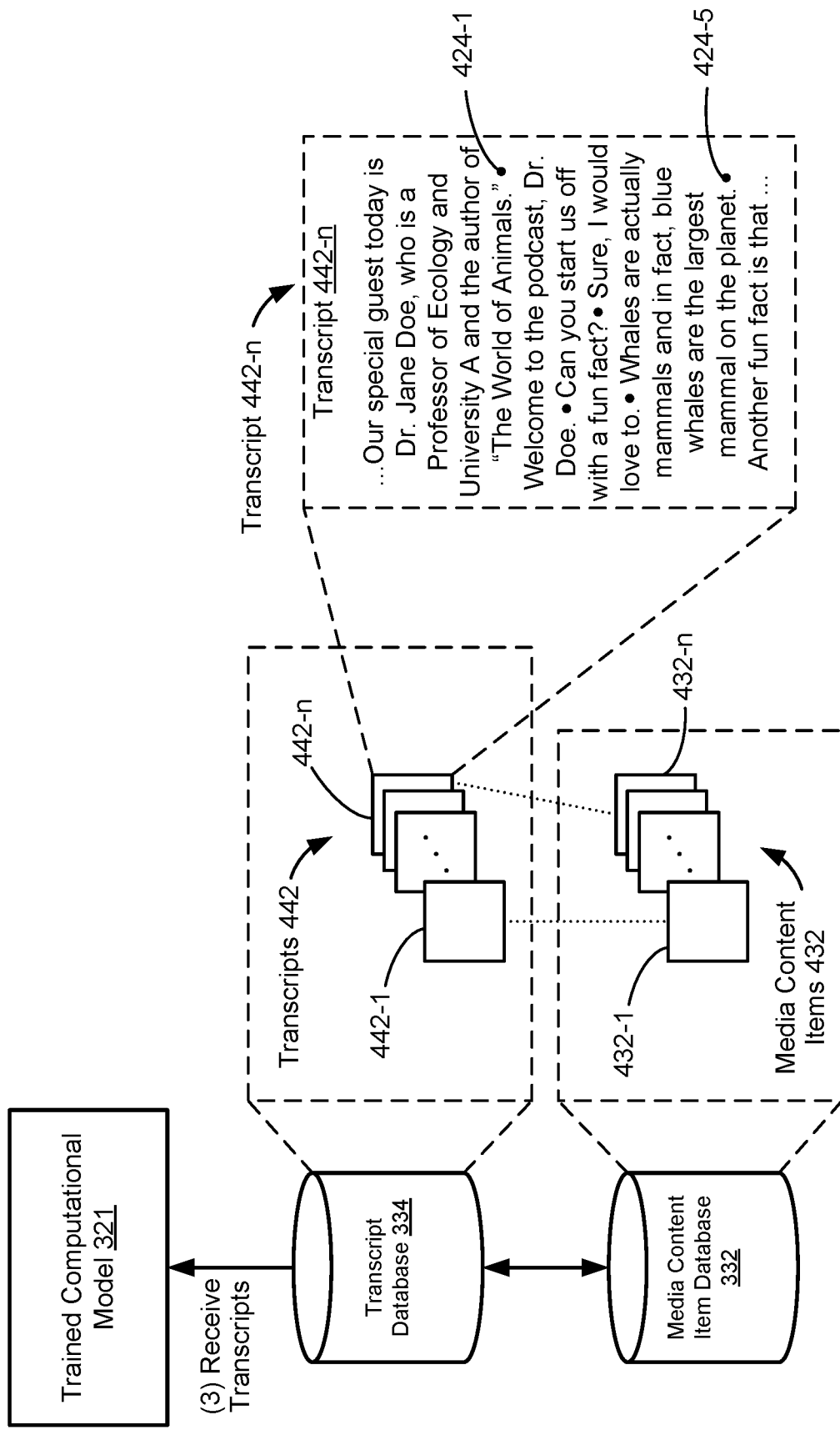
FIG. 4C illustrates processing transcripts for provision to a trained computational model, in accordance with some embodiments.

FIG. 4C illustrates processing transcripts for provision to trained computational model(s) 321, in accordance with some embodiments. The trained computational model(s) 321 receive a plurality of transcripts 442 from the transcript database 334. Each transcript in the plurality of transcripts 442 corresponds to a media content item 432 that is stored in the media content item database 332. For example, transcript 442-1 corresponds to (e.g., is a transcription of audio content in) the media content item 432-1, and transcript 442-n corresponds to (e.g., is a transcription of audio content in) the media content item 432-n. In some embodiments, the plurality of media content items 432 includes audio files for a variety of media types, such as podcasts, audiobooks, and news reports. In some embodiments, the plurality of media content items 432 consists of a single type of media content (e.g., all media content items are podcasts). In some embodiments, the plurality of media content items 432 consists of podcasts. For example, if the media content item 432-1 is a podcast episode, then transcript 442-1 is a transcript of the media content item 432-1 (e.g., is a transcription of the podcast episode).

In some embodiments, each transcript in the plurality of transcripts 442 is processed prior to being provided (e.g., being transmitted) to the trained computational model(s) 321. Processing a transcript includes identifying the position of at least a portion of words within the transcript (e.g., "special" is the 20th word in transcript 442-n) and identifying the start of each sentence within the transcript. In some embodiments, the position of each word in the transcript is identified. The black dots shown in FIG. 4C represent a marker indicating a start of a sentence. For example, dot 424-1 signifies the start of the sentence, "Welcome to the podcast . . . " and dot 424-5 represents the start of the sentence, "Another fun fact . . . " Similarly, each media content item in the plurality of media content items 432 is also processed such that a word or start of a sentence in the transcript can be mapped to a specific time within the media content item. For example, processing of the transcripts and the media content items correlate the start of the sentence "Another fun fact . . . ," represented by dot 424-5, in transcript 442-n to a specific time (e.g., 2 minutes and 17 seconds) in media content item 432-n. The trained computational model(s) 321 receives (step 3) the processed transcripts. In some embodiments, the trained computational model(s) 321 receives the processed transcripts prior to receiving a user request 122 or a processed user request 401.

Figure 5A:
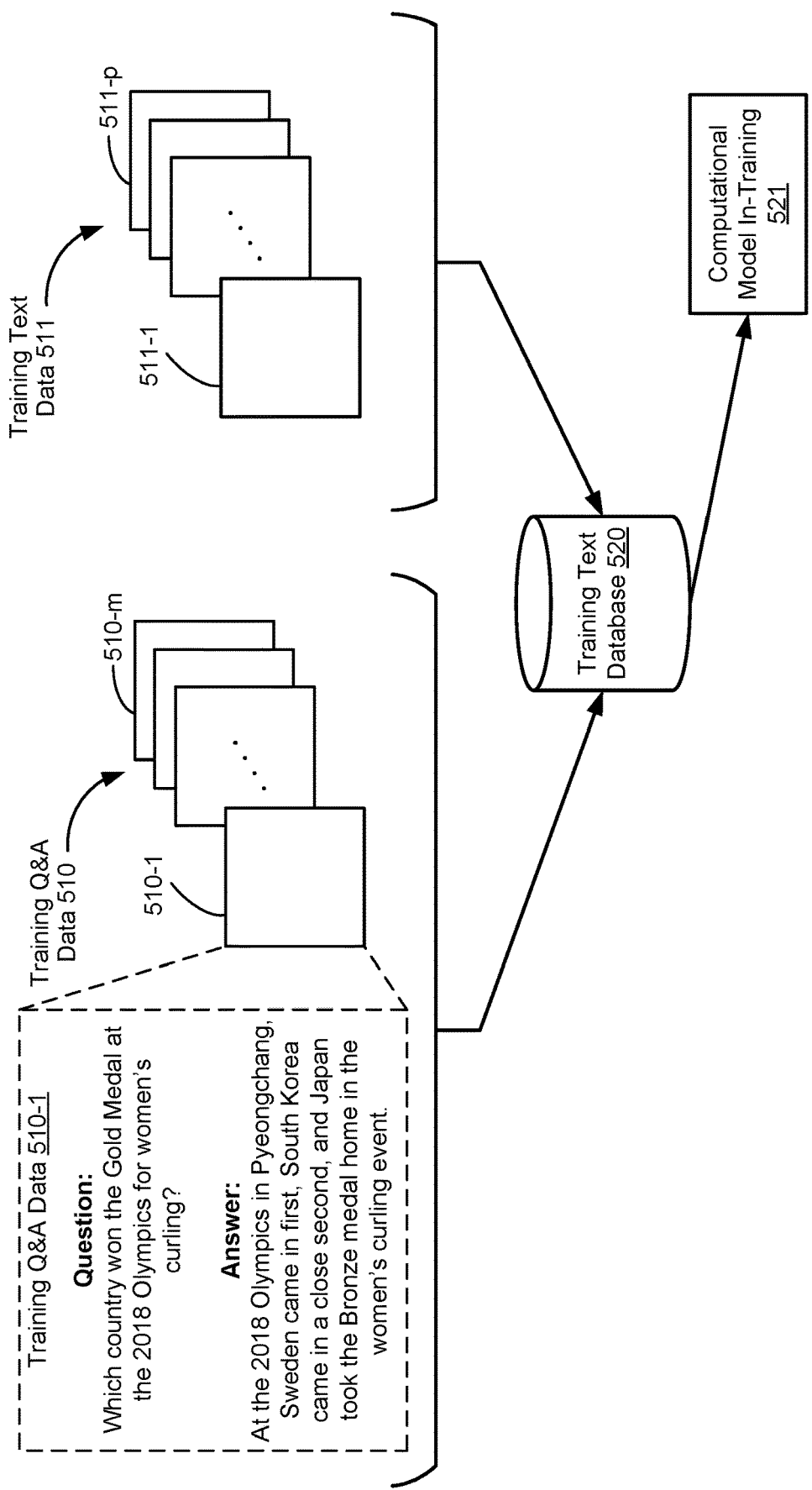
FIG. 5A illustrates training the computational model, in accordance with some embodiments.

FIG. 5A illustrates training the computational model, in accordance with some embodiments. The trained computational model(s) 321 are trained using training question and answer data 510 (also referred to herein as training Q&A data 510). The training Q&A data 510 includes a plurality of training text data 510 (e.g., training text data 510-1 to 510-m), each of which includes a question and an answer pair. In some embodiments, the answer in the question and answer pair is a passage or segment from a body of training text data 511 (e.g., training text data 511-1 to 511-p, a paragraph in an article). Thus, training text database 520 includes the training Q&A data 510 (e.g., the question and answer pair) as well as training text data 511 (e.g., articles) from which the answers in the training Q&A data 510 are derived. For example, training Q&A data 510-1 includes the question, "Which country won the Gold Medal at the 2018 Olympics for women's curling?" and the answer, "At the 2018 Olympics in Pyeongchang, Sweden came in first, South Korea came in a close second, and Japan took the Bronze medal home in the women's curling event." The training Q&A data 510 and the training text data 511 from which the answer from the training Q&A data 510 can be found (e.g., the article that the answer can be found in) are provided to a computational model in-training 521 as inputs for training the computational model in-training 521. For example, the training text database 520 stores the training Q&A data 510 and the training text data 511, and may be a preexisting database, such as "The Stanford Question Answering Dataset" (also known as SQuAD), which includes questions from crowd workers on a set of Wikipedia articles, and answers to the questions that are a segment of text or a passage from an article of the set of Wikipedia articles.

Figure 5B:
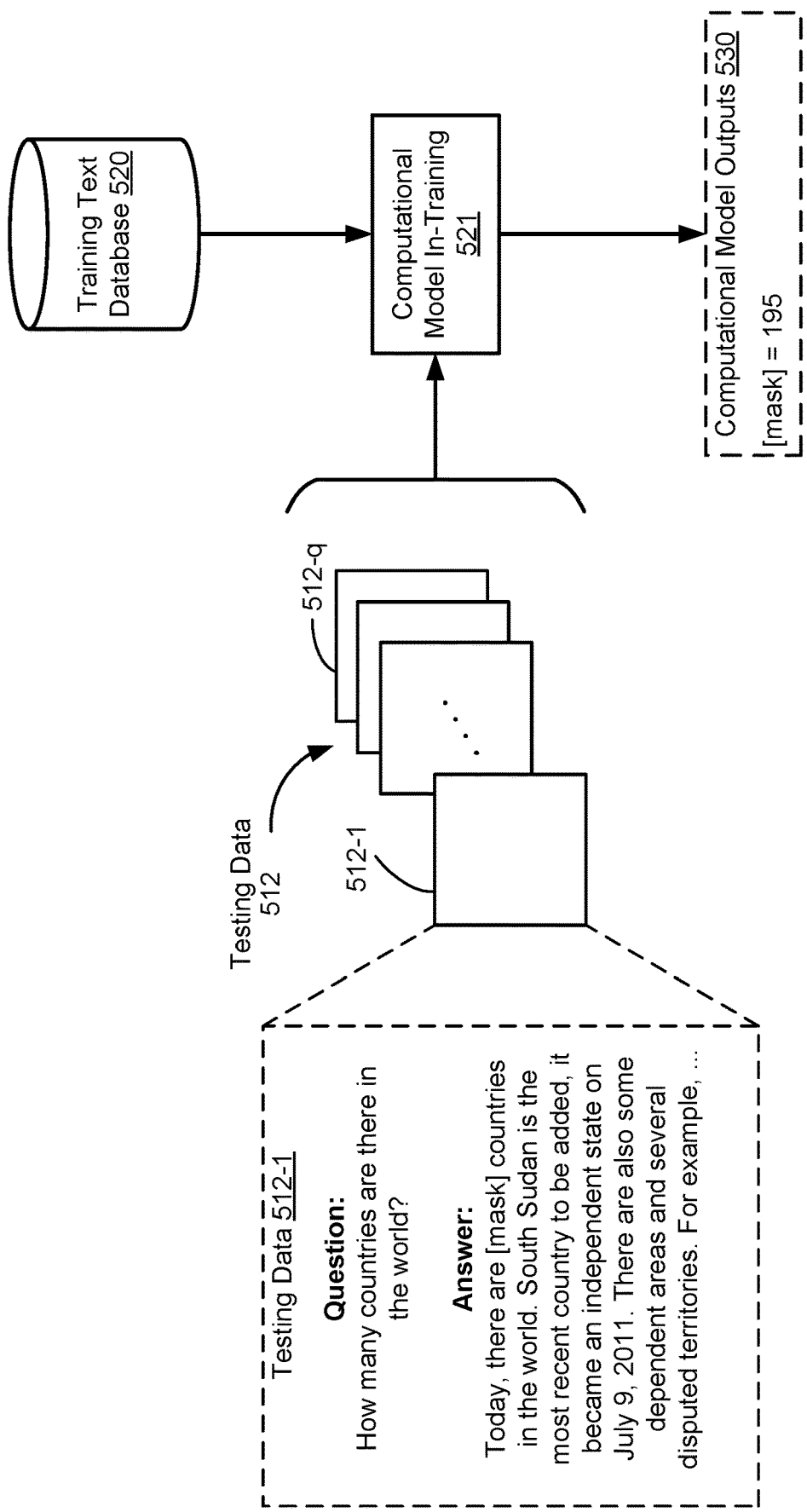
FIG. 5B illustrates outputs from a computational model during testing and training, in accordance with some embodiments.

FIG. 5B illustrates outputs from a computational model during testing and training, in accordance with some embodiments. During training of the computational model in-training 521, information stored in the training text database 520, including the plurality of training Q&A data 510 and the training text data 511 (e.g., articles) from which the answers in the training Q&A data 510 are extracted (e.g., derived), are provided to the computational model in-training 521. The computational model in-training 521 receives the training Q&A data 510 and the training text data 511 (e.g., articles) as inputs in order to train the model to predict which words in a body of text provide a relevant response to a question. Thus, during training and testing of the computational model in-training 521, the computational model in-training 521 receives, as inputs, testing data 512 (e.g., testing data 512-1 to 512-q) that include a question and answer pair where one or more words in the answer is masked. The computational model in-training 521 provides one or more predicted words for each masked word in the testing data 512 as computation model outputs 530. For example, one or more words in the answer of the testing data 512-1 are masked so that the answer in the testing data 512-1 reads, "Today, there are [mask] countries in the world. South Sudan is the most recent country to be added, it became an independent state on Jul. 9, 2011. There are also some dependent areas and several disputed territories. For example, . . . " In this example, the computational model in-training 521 outputs "195" as the predicted word corresponding to the masked word which is correct (e.g., the masked word in the answer of testing data 512-1 is "195"). In some cases, in addition to outputting the predicted word(s), the computational model in-training 521 may also be trained to output the word position(s) of the predicted word(s) and/or a confidence score associated with each predicted word. Once training of the computational model in-training 521 is complete, the trained computational model 321 can be used to identify (e.g., predict, provide) a transcript and a word position of a word or phrase in the identified transcript that is determined to be relevant to the user request (as shown in FIG. 4A).

In some embodiments, the plurality of testing data 512 are different from (e.g., distinct from, does not include, is non-overlapping with) the plurality of training Q&A data 510. For example, the plurality of testing data 512 includes a first set of question and answer pairs and the plurality of training Q&A data 510 includes a second set of question and answer pairs such that a question and answer pair of the first set of question and answer pairs is not included in the second set of question and answer pairs and vice versa. In some embodiments, the plurality of testing data 512 include at least one question and answer pair that is different from (e.g., distinct from, does not include, is non-overlapping with) the plurality of training Q&A data 510. For example, the testing data 512 may include one or more questions that are included in the plurality of training Q&A data 510 as well as additional questions that are not included in the plurality of training Q&A data 510.

Each of the training Q&A data 510, the training text data 511, and the testing data 512 are different from (e.g., distinct from, not including, does not comprise) the plurality of transcripts 442 provided to the trained computational model(s) 321 when using the trained computational model(s) 321 in providing media content items in response to user requests 122. Thus, a computational model (such as trained computational model(s) 321) that is trained using data and information that is different from the plurality of transcripts 442 is able to use the plurality of transcripts 442 as sources for providing answers to user requests 122 for information (e.g., user questions, user inquiries) even if the trained computational model(s) 321 have not been trained using any data from the plurality of transcripts 442.

FIGS. 6A-6C are flow diagrams illustrating a method 600 of providing playback of media content items in response to user requests for information, in accordance with some embodiments. Method 600 may be performed (602) at an electronic device (e.g., media content server 104) having one or more processors and memory storing instructions for execution by the one or more processors. In some embodiments, the method 600 is performed by executing instructions stored in the memory (e.g., memory 306, FIG. 3) of the electronic device. In performing the method 600, the electronic device (e.g., media content server 104) retrieves (610) a plurality of transcripts 442 from a database (e.g., transcript database 334). Each transcript in the plurality of transcripts 442 corresponds to audio from a media content item of a plurality of media content items 432 that are provided by a media providing service (e.g., stored in a media content item database 332 associated with a media providing service). The electronic device (e.g., media content server 104) applies (620) each transcript of the plurality of transcripts 442 to a trained computational model 321, and receives (630) a user request 122 for information regarding a topic. The user request 122 includes a string of words. In response to the user request (640), the electronic device (e.g., media content server 104) identifies (644), by applying the string of words to the trained computational model 321, a transcript 422 (from the plurality of transcripts 442 in the transcript database 334) that is relevant to the topic, and a word position 424 within the transcript 422 that is relevant to the topic. The electronic device (e.g., media content server 104) also provides (645) at least a portion of a media content item corresponding to the identified transcript 422, beginning at a starting position (e.g., playback initiation time) that is based on the position within the identified transcript 422 that is relevant to the topic.

In some embodiments, the user request for information is an open-ended request for information (e.g., a request having no widely-agreed upon factual answer). To that end, in some embodiments, the user request for information is a request for a perspective or opinion.

In some embodiments, for each transcript of the plurality of transcripts 442, the electronic device (e.g., media content server 104) identifies (612) a start of each sentence in the transcript (see dots 424-1 and 424-5 in FIG. 4C).

In some embodiments, the trained computational model is a trained neural network. In some embodiments, the neural network is a Bidirectional Encoder Representations from Transformers (BERT) neural network, or a BERT-style neural network (e.g., a neural network based on the BERT architecture).

In some embodiments, the trained computational model 321 is trained (621), using a training set of training questions and answers (e.g., training Q&A data 512), to provide a word position 424 within a known text source (e.g., a transcript of the plurality of transcripts 442) in response to receiving a user request 122 for information. The training set of questions and answers (e.g., training Q&A data 512) is distinct and separate from the plurality of transcripts 442.

In some embodiments, the string of words and the plurality of transcripts 442 are provided (622) to an input layer of the trained computational model 321 (e.g., the transcripts are pre-processed by the computational model in order to reduce the processing time in response to a user request). In some embodiments, the string of words and the plurality of transcripts 422 are simultaneously provided (623) to the trained computational model 321. Regardless of whether the string of words and the plurality of transcripts are provided to the computational model simultaneously or at different times, in some embodiments, both the string of words (e.g., the user request) and the transcripts are provided to the same input layer of the same trained computational model. In some embodiments, the inputs to the input layer are tagged to indicate to the computational model whether an input is string of words (e.g., a user request) or a transcript (e.g., containing a potential answer to the user request).

In some embodiments, the plurality of transcripts 442 are provided (624) to the trained computational model 321 prior to receiving the user request 122.

In some embodiments, an identifier of the transcript 422 relevant to the topic and an identifier of the position 424 within the transcript 422 relevant to the topic are output by the trained computational model 321 (e.g., identified directly by an output layer of the trained computation model). In some embodiments, because the identifier of the transcript 422 and the identifier of the position 424 are output directly by the trained computational model 321, such embodiments do not require, for example, generating separate results (e.g., embeddings) for the questions and potential answers, and comparing the separate results.

In some embodiments, the user request is a natural language utterance. The method 600 further includes, generating (632), by the electronic device (e.g., media content server 104), the string of words based on the natural language utterance.

In some embodiments, the electronic device (e.g., media content server 104) identifies (641) a subset of the plurality of transcripts 442 that are relevant to the topic based at least in part on metadata of media content items that correspond to the subset of the plurality of transcripts 442. The identified transcript 422 is identified from the subset of the plurality of transcripts 442.

In some embodiments, the electronic device (e.g., media content server 104) receives (642), from the trained computational model 321, a plurality of confidence scores 426. Each of the plurality of confidence scores 426 is associated with a transcript 422 that is identified to be relevant to the topic.

In some embodiments, the electronic device (e.g., media content server 104) selects (643) the identified transcript 422 based at least in part on the plurality of confidence scores 426.

In some embodiments, the identified position 424 within the identified transcript 422 that is relevant to the topic corresponds (646) to a position 424 of a word within the identified transcript 422 that is relevant to the topic.

In some embodiments, the identified position 424 of the word within the identified transcript 422 that is relevant to the topic is located in a middle of a sentence. The electronic device (e.g., media content server 104) provides instructions for the electronic device 102 to initiate (647) playback of the media content item corresponding to the identified transcript 422 at a start of the sentence.

In some embodiments, the plurality of media content items 432 comprises (648) spoken word media content items. For example, the plurality of media content items 432 may comprise podcast episodes.

Although FIGS. 6A-6C illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
    retrieving, from a database, a plurality of transcripts, each transcript in the plurality of transcripts corresponding to audio from a media content item of a plurality of media content items that are provided by a media providing service;
    applying each transcript of the plurality of transcripts to a trained computational model;
    receiving a user request for information regarding a topic, wherein the user request includes a string of words; and
    in response to the user request:
        identifying, by applying the string of words to the trained computational model:
            a transcript from the database that is relevant to the topic;
            a position within the transcript that is relevant to the topic; and
        causing playback of at least a portion of a media content item corresponding to the identified transcript, beginning at a starting position that is based on the position within the identified transcript that is relevant to the topic,
    wherein:
        the trained computational model is trained, using a training set of questions and answers, to provide a position within a known text source in response to receiving a user request for information; and
        the training set of questions and answers is distinct and separate from the plurality of transcripts.

2. The method of claim 1, wherein:
    the identified position within the identified transcript that is relevant to the topic corresponds to a position of a word within the identified transcript that is relevant to the topic.

3. The method of claim 2, wherein:
    the identified position of the word within the identified transcript that is relevant to the topic is located in a middle of a sentence; and
    causing playback of the at least a portion of the media content item corresponding to the identified transcript includes initiating playback of the media content item corresponding to the identified transcript at a start of the sentence.

4. The method of claim 1, further comprising:
    prior to identifying the transcript and the position within the transcript, identifying a subset of the plurality of transcripts that are relevant to the topic based at least in part on metadata of media content items that correspond to the subset of the plurality of transcripts,
    wherein the identified transcript is identified from the subset of the plurality of transcripts.

5. The method of claim 1, wherein the plurality of media content items comprises spoken word media content items.

6. The method of claim 1, wherein the string of words and the plurality of transcripts are provided to an input layer of the trained computational model.

7. The method of claim 1, wherein the string of words and the plurality of transcripts are simultaneously provided to the trained computational model.

8. The method of claim 1, wherein the plurality of transcripts are provided to the trained computational model prior to receiving the user request.

9. The method of claim 1, wherein an identifier of the transcript relevant to the topic and an identifier of the position within the transcript relevant to the topic are output by the trained computational model.

10. The method of claim 1, further comprising:
receiving, from the trained computational model, a confidence score associated with the identified position within the identified transcript that is relevant to the topic,
wherein the identified transcript is identified using the confidence score.

11. The method of claim 1, further comprising:
receiving, from the trained computational model, a plurality of confidence scores, wherein each of the plurality of confidence scores is associated with a transcript that is identified to be relevant to the topic; and
selecting, the identified transcript based at least in part on the plurality of confidence scores.

12. The method of claim 1, wherein the user request is a natural language utterance, the method further comprising:
generating the string of words based on the natural language utterance.

13. The method of claim 1, further comprising:
prior to receiving the user request and for each transcript of the plurality of transcripts, identifying a start of each sentence in the transcript.

14. An electronic device, comprising:
one or more processors; and
memory storing one or more programs, the one or more programs including instructions for:
retrieving, from a database, a plurality of transcripts, each transcript in the plurality of transcripts corresponding to audio from a media content item of a plurality of media content items that are provided by a media providing service;
applying each transcript of the plurality of transcripts to a trained computational model;
receiving a user request for information regarding a topic, wherein the user request includes a string of words; and
in response to the user request:
identifying, by applying the string of words to the trained computational model:
a transcript from the database that is relevant to the topic;
a position within the transcript that is relevant to the topic; and
causing playback of at least a portion of a media content item corresponding to the identified transcript, beginning at a starting position that is based on the position within the identified transcript that is relevant to the topic,
wherein:
the trained computational model is trained, using a training set of questions and answers, to provide a position within a known text source in response to receiving a user request for information; and
the training set of questions and answers is distinct and separate from the plurality of transcripts.

15. A non-transitory computer-readable storage medium storing one or more programs, the one or more programs including instructions that, when executed by an electronic device with one or more processors, cause the electronic device to:
retrieve, from a database, a plurality of transcripts, each transcript in the plurality of transcripts corresponding to audio from a media content item of a plurality of media content items that are provided by a media providing service;
apply each transcript of the plurality of transcripts to a trained computational model;
receive a user request for information regarding a topic, wherein the user request includes a string of words; and
in response to the user request:
identify, by applying the string of words to the trained computational model:
a transcript from the database that is relevant to the topic;
a position within the transcript that is relevant to the topic; and
cause playback of at least a portion of a media content item corresponding to the identified transcript, beginning at a starting position that is based on the position within the identified transcript that is relevant to the topic,
wherein:
the trained computational model is trained, using a training set of questions and answers, to provide a position within a known text source in response to receiving a user request for information; and
the training set of questions and answers is distinct and separate from the plurality of transcripts.

\* \* \* \* \*